(12) United States Patent
Beppu

(10) Patent No.: US 8,404,147 B2
(45) Date of Patent: Mar. 26, 2013

(54) PROCESS FOR PRODUCING LITHIUM IRON PHOSPHATE PARTICLES AND METHOD FOR PRODUCING SECONDARY CELL

(75) Inventor: Yoshihisa Beppu, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/243,250

(22) Filed: Sep. 23, 2011

(65) Prior Publication Data

US 2012/0007021 A1 Jan. 12, 2012

Related U.S. Application Data

(63) Continuation of application No. PCT/JP2010/056032, filed on Apr. 1, 2010.

(30) Foreign Application Priority Data

Apr. 3, 2009 (JP) .................................. 2009-091581

(51) Int. Cl.
*H01M 4/88* (2006.01)

(52) U.S. Cl. ................... 252/182.1; 252/506; 252/518.1; 252/519.14; 423/263; 423/306; 429/231.5; 429/231.9

(58) Field of Classification Search ............... 252/182.1, 252/518.1, 506, 519.14; 423/263, 306; 429/231.5, 429/231.9
See application file for complete search history.

(56) References Cited

U.S. PATENT DOCUMENTS

| | | | |
|---|---|---|---|
| 5,871,866 A | 2/1999 | Barker et al. | |
| 5,910,382 A | 6/1999 | Goodenough et al. | |
| 6,203,946 B1 | 3/2001 | Barker et al. | |
| 6,391,493 B1 | 5/2002 | Goodenough et al. | |
| 6,447,951 B1 | 9/2002 | Barker et al. | |
| 6,514,640 B1 | 2/2003 | Armand et al. | |
| 6,720,110 B2 | 4/2004 | Barker et al. | |
| 7,955,733 B2 | 6/2011 | Armand et al. | |
| 7,960,058 B2 | 6/2011 | Goodenough et al. | |
| 7,964,308 B2 | 6/2011 | Goodenough et al. | |
| 2003/0082454 A1 | 5/2003 | Armand et al. | |
| 2004/0086784 A1* | 5/2004 | Barker et al. | 429/231.5 |
| 2004/0202935 A1 | 10/2004 | Barker et al. | |
| 2005/0003274 A1 | 1/2005 | Armand et al. | |

(Continued)

FOREIGN PATENT DOCUMENTS

| | | |
|---|---|---|
| JP | 2002-56849 | 2/2002 |
| JP | 2005-158673 | 6/2005 |

(Continued)

OTHER PUBLICATIONS

International Search Report issued Jul. 6, 2010 in PCT/JP2010/056032 filed Apr. 1, 2010.

(Continued)

*Primary Examiner* — Khanh Tuan Nguyen

(74) *Attorney, Agent, or Firm* — Oblon, Spivak, McClelland, Maier & Neustadt, L.L.P.

(57) ABSTRACT

The present invention relates to a process for producing lithium iron phosphate particles, wherein the process has a step of obtaining a melt containing, as represented by mol % based on oxides, from 1 to 50% of $Li_2O$, from 20 to 50% of $Fe_2O_3$ and from 30 to 60% of $P_2O_5$; a step of cooling and solidifying the melt; a step of pulverizing the solidified product into a desired particle shape; and a step of heating the pulverized product in the air or under oxidizing conditions (0.21<oxygen partial pressure<1.0) at from 350 to 800° C. to precipitate crystals of $Li_nFe_2(PO_4)_3$ (0<n<3), in this order.

14 Claims, 1 Drawing Sheet

U.S. PATENT DOCUMENTS

| | | |
|---|---|---|
| 2005/0244321 A1 | 11/2005 | Armand et al. |
| 2006/0194113 A1* | 8/2006 | Okada et al. .............. 429/231.9 |
| 2007/0117019 A1 | 5/2007 | Armand et al. |
| 2007/0166618 A1 | 7/2007 | Armand et al. |
| 2007/0281215 A1 | 12/2007 | Armand et al. |
| 2010/0035154 A1 | 2/2010 | Isono |
| 2010/0310935 A1 | 12/2010 | Armand et al. |
| 2010/0314589 A1 | 12/2010 | Armand et al. |
| 2010/0316909 A1 | 12/2010 | Armand et al. |
| 2011/0017959 A1 | 1/2011 | Armand et al. |
| 2011/0039158 A1 | 2/2011 | Armand et al. |
| 2011/0068297 A1 | 3/2011 | Armand et al. |

FOREIGN PATENT DOCUMENTS

| | | |
|---|---|---|
| JP | 2008-47412 | 2/2008 |
| JP | 2008-204701 | 9/2008 |
| WO | WO 2008/062111 | 5/2008 |

OTHER PUBLICATIONS

A.K. Padhi et al.; "Effect of Structure on the $Fe^{3+}/Fe^{2+}$ Redox Couple in Iron Phosphates"; J. Electrochem. Soc., 1997, vol. 144, No. 5, pp. 1609-1613.

U.S. Appl. No. 13/334,872, filed Dec. 22, 2011, Beppu, et al.

U.S. Appl. No. 13/607,252, filed Sep. 7, 2012, Beppu.

* cited by examiner

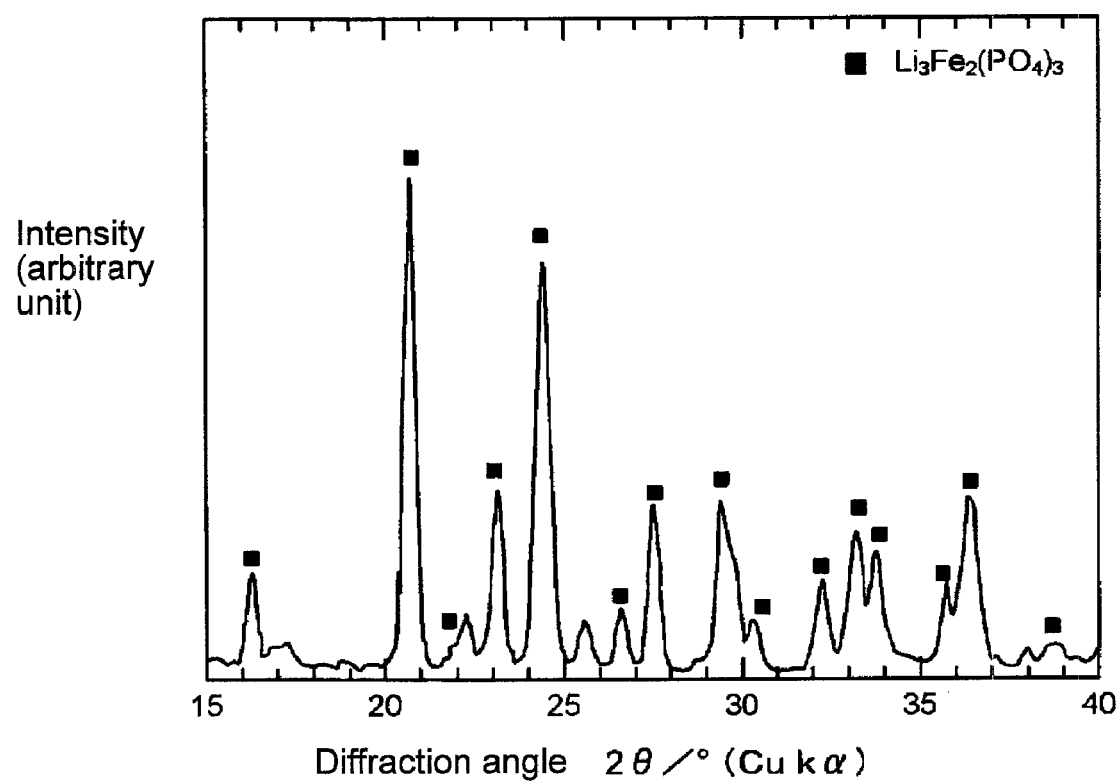

PROCESS FOR PRODUCING LITHIUM IRON PHOSPHATE PARTICLES AND METHOD FOR PRODUCING SECONDARY CELL

TECHNICAL FIELD

The present invention relates to a process for producing lithium iron phosphate particles and a method for producing a secondary cell.

BACKGROUND ART

A solid electrolyte is free from liquid leakage and is thereby safe, and is highly reliable, and thus it is used as a material of e.g. a cell, a gas sensor and a double layer capacitor. As a material for forming a solid electrolyte, a lithium type material has been widely used. Further, as a cathode of a non-aqueous electrolyte secondary cell, lithium cobalt oxide and its composite oxide have been employed. A secondary cell employing e.g. lithium cobalt oxide as a cathode has a high operating voltage and a high energy density and is light in weight, and thus it is widely used as a power source of a portable electronic device, an electric power tool and an electric automobile.

However, the material such as lithium cobalt oxide employs a rare element in view of the resource and is thereby expensive and in addition, it has drawbacks such that its safety is not necessarily sufficient. Further, for a non-aqueous electrolyte secondary cell, higher performance and larger capacity are required. Under these circumstances, development of a material which is available at a low cost, is safe and has excellent performance, which will replace lithium cobalt oxide, is in an urgent need. As such an alternative material, in recent years, NASICON type or olivine type lithium iron phosphate material attracts attention, and its development and research are remarkably in progress.

As a method for producing a lithium iron phosphate type material, various methods have been proposed. Patent Document 1 discloses, as a method for producing NASICON type lithium iron phosphate, a method of producing $Li_nFe_2(PO_4)_3$ ($0<n\leqq3$) by solid phase reaction. In this method, after lithium iron phosphate is formed by solid phase reaction, in order to use a lithium iron phosphate type active material as a cathode material, the lithium iron phosphate should be pulverized. Therefore, the cell performance when such lithium iron phosphate is employed for the cathode may be deteriorated e.g. due to a decrease in the crystallinity of such lithium iron phosphate.

Patent Document 2 discloses a method of melting a material containing e.g. $Li_2O$, $Fe_2O_3$, $P_2O_5$ and $Nb_2O_5$, quenching the resulting melt to form precursor glass, and subjecting this precursor glass to heat treatment to produce NASICON type, olivine type or spinel type lithium iron phosphate. To form the precursor glass, e.g. a $Nb_2O_5$ source is added in addition to a $Li_2O$ source, a $Fe_2O_3$ source and a $P_2O_5$ source. Accordingly, only lithium iron phosphate crystals containing e.g. Nb derived from the starting material, such as $Li(Fe,Nb)(PO_4)_3$ or $Li_3(Fe,Nb)_2(PO_4)_3$ has been obtained.

Patent Document 2 failed to disclose a method for producing lithium iron phosphate particles. Further, although Patent Document 2 discloses a power X-ray diffraction pattern of lithium iron phosphate, in order to obtain lithium iron phosphate particles, a formed product having precursor glass crystallized by heat treatment should be pulverized, which may lead to various drawbacks such as a decrease in the crystallinity of lithium iron phosphate. Further, in a case where laser treatment is employed for heating, e.g. a cost increase in the crystallization step is inevitable.

As described above, lithium iron phosphate is available at a low cost and is highly safe as compared with lithium cobalt oxide, and thus it is expected as a material for a solid electrolyte and a cathode-material for a secondary cell. Particularly, NASICON type lithium iron phosphate represented by $Li_nFe_2(PO_4)_3$ ($0<n\leqq3$), which contributes to an improvement in properties of a solid electrolyte or a cathode for a secondary cell, attracts attention. However, a conventional method for producing lithium iron phosphate particles has drawbacks such as low crystallinity of particles to be obtained, or such that the uniformity of the particle size or the chemical composition is likely to be decreased.

PRIOR ART DOCUMENTS

Patent Documents
Patent Document 1: JP-A-2002-056849
Patent Document 2: JP-A-2008-047412

DISCLOSURE OF INVENTION

Technical Problem

It is an object of the present invention to provide a process for producing NASICON type lithium iron phosphate particles which are excellent in uniformity of the particle size and the chemical composition and further have high crystallinity, at a low cost without special apparatus or reaction conditions. Further, it is also an object of the present invention to provide a method for producing a secondary cell excellent in properties and reliability, at a low cost and easily, by using the lithium iron phosphate particles.

Solution to Problem

The present invention provides a process for producing lithium iron phosphate particles and a method for producing a secondary cell according to the following [1] to [10].

[1] A process for producing lithium iron phosphate particles, which comprises a step of obtaining a melt containing, as represented by mol % based on oxides, from 1 to 50% of $Li_2O$, from 20 to 50% of $Fe_2O_3$ and from 30 to 60% of $P_2O_5$; a step of cooling and solidifying the melt; a step of pulverizing the solidified product, and a step of heating the pulverized product in the air or under oxidizing conditions with an oxygen partial pressure of higher than 0.21 and at most 1.0 at from 350 to 800° C. to precipitate crystals of $Li_nFe_2(PO_4)_3$ ($0<n\leqq3$), in this order.

[2] The process for producing lithium iron phosphate particles according to [1], wherein as the $Li_2O$ source, at least one member selected from the group consisting of lithium carbonate ($Li_2CO_3$), lithium hydroxide (LiOH), lithium phosphate ($Li_3PO_4$), lithium hydrogen phosphate ($Li_2HPO_4$), lithium dihydrogen phosphate ($LiH_2PO_4$) and a hydrate thereof, is used.

[3] The process for producing lithium iron phosphate particles according to [1] or [2], wherein as the $Fe_2O_3$ source, at least one member selected from the group consisting of ferrous oxide (FeO), ferrosoferric oxide ($Fe_3O_4$), ferric oxide ($Fe_2O_3$), ferric oxyhydroxide (FeO(OH)), metal iron (Fe), ferric phosphate ($FePO_4$), ferrous phosphate ($Fe_3(PO_4)_2$), ferric pyrophosphate ($Fe_4(P_2O_7)_3$) and a hydrate thereof, is used.

[4] The process for producing lithium iron phosphate particles according to any one of [1] to [3], wherein as the $P_2O_5$ source, at least one member selected from the group consisting of phosphorus pentoxide ($P_2O_5$), phosphoric acid ($H_3PO_4$), ammonium phosphate (($NH_4)_3PO_4$), ammonium phosphate, dibasic (($NH_4)_2HPO_4$), ammonium phosphate, monobasic ($NH_4H_2PO_4$), ferric phosphate ($FePO_4$), ferrous phosphate ($Fe_3(PO_4)_2$), ferric pyrophosphate ($Fe_4(P_2O_7)_3$) and a hydrate thereof, is used.

[5] The process for producing lithium iron phosphate particles according to any one of [1] to [4], wherein as the $Fe_2O_3$ source, ferric oxide ($Fe_2O_3$) is used.

[6] The process for producing lithium iron phosphate particles according to any one of [1] to [5], wherein all the above steps are carried out in the air or under the above oxidizing conditions.

[7] The process for producing lithium iron phosphate particles according to any one of [1] to [6], wherein the valency of Fe in the crystals is +3-valent.

[8] The process for producing lithium iron phosphate particles according to any one of [1] to [7], wherein the above $Li_nFe_2(PO_4)_3$ is $Li_3Fe_2(PO_4)_3$.

[9] The process for producing lithium iron phosphate particles according to any one of [1] to [8], wherein the rate of cooling the melt is at least 100° C./sec.

[10] A method for producing a secondary cell, which comprises using the lithium iron phosphate particles obtained by the process for producing lithium iron phosphate particles as defined in any one of [1] to [9], as a cathode material for a secondary cell to produce a secondary cell.

Advantageous Effects of Invention

According to the production process of the present invention, NASICON type lithium iron phosphate particles being excellent in the uniformity of the particle size and the chemical composition and having high crystallinity can be produced at a low cost without special apparatus or reaction conditions. Accordingly, lithium iron phosphate particles excellent in the properties and reliability and a secondary cell can be produced easily at a low cost.

BRIEF DESCRIPTION OF DRAWING

FIG. 1 is a view illustrating an X-ray diffraction pattern of lithium iron phosphate particles obtained in Example 4 of the present invention.

DESCRIPTION OF EMBODIMENTS

The production process of the present invention comprises the following steps (1), (2), (3) and (4) in this order.
(1) A step of obtaining a melt containing from 1 to 50% $Li_2O$, from 20 to 50% of $Fe_2O_3$ and from 30 to 60% of $P_2O_5$ (hereinafter referred to as "melting step").
(2) A step of cooling and solidifying the melt (hereinafter referred to as "cooling step").
(3) A step of pulverizing the solidified product into a desired particle shape (hereinafter referred to as "pulverizing step").
(4) A step of heating the pulverized product in the air or under oxidizing conditions (0.21<oxygen partial pressure≦1.0) at from 350 to 800° C. to precipitate crystals of $Li_nFe_2(PO_4)_3$ (0<n≦3) (hereinafter referred to as "heating step").

[Melting Step]

The melting step is a step of obtaining a melt containing, as represented by mol % based on oxides, from 1 to 50% of $Li_2O$, from 20 to 50% of $Fe_2O_3$ and from 30 to 60% of $P_2O_5$. A melt having such a composition range can be melted and has a proper viscosity, and it can thereby be treated easily in the subsequent cooling step and is preferred. Here, melting means that a compound (Li source) to be a $Li_2O$ source, a compound (Fe-source) to be a $Fe_2O_3$ source and a compound (P source) to be a $P_2O_5$ source as materials are melted to be in a visually transparent state. Hereinafter "%" representing the composition represents mol % based on oxides.

If the content of $Fe_2O_3$ in the melt exceeds 50% or if the content of $P_2O_5$ is less than 30%, melting tends to be incomplete. If the content of $Li_2O$ is less than 1%, no desired $Li_nFe_2(PO_4)_3$ (0<n≦3) particles will be obtained. On the other hand, if the content of $Fe_2O_3$ in the melt is less than 20%, if the content of $P_2O_5$ exceeds 60%, or if the content of $Li_2O$ exceeds 50%, no desired $Li_nFe_2(PO_4)_3$ (0<n≦3) particles will be obtained even though subsequent treatments are carried out.

The melt more preferably contains from 10 to 50% of $Li_2O$, from 20 to 35% of $Fe_2O_3$ and from 30 to 50% of $P_2O_5$. A melt having such a composition can be completely melted, and $Li_nFe_2(PO_4)_3$ (0<n≦3) particles are likely to be obtained, and thus the subsequent treatment will easily be carried out. The composition of the melt is properly selected depending on the desired composition ($Li_nFe_2(PO_4)_3$ (0<n≦3)) of particles, and is basically adjusted so that the total content of the respective components will be 100%.

Further, in a case where the lithium iron phosphate particles to be obtained are used as a cathode material for a secondary cell, in order to increase the cell performance, part of Fe may be replaced with M (wherein M is at least one member selected from Mn, Co and Ni). The proportion is preferably from 1% to 50% by M/(Fe+M) as calculated as atoms.

Here, mol % based on oxides in the present invention means mol percentage based on molecules to be an oxide which provides the maximum oxidation number of the metal, unless otherwise specified, and is calculated from the amount of the material charged. That is, the amounts of the respective elements (Li, Fe and P) derived from the respective materials are obtained from the amounts of materials charged, and the amounts of the respective elements are calculated to the amounts of oxides ($Li_2O$, $Fe_2O_3$ and $P_2O_5$) which provide the maximum oxidation number of the respective elements, and the proportions (mol %) of the respective oxides based on their total are calculated to determine mol % based on oxides.

The melt can be obtained by mixing a Li source, a Fe source and a P source as materials with a predetermined proportion so that the composition of the melt to be obtained is the above composition, and heating the material mixture in the air or under oxidizing conditions (0.21<oxygen partial pressure≦1.0).

The composition of the material mixture theoretically corresponds to the composition of the melt obtained from the mixture in principle. However, a component which is likely to disappear e.g. by volatilization during melting, such as P, exists in the material mixture, and accordingly the composition of the melt obtained is slightly different from the mol % based on oxides calculated from the amounts of the respective materials charged in some cases.

As the Li source, it is preferred to use at least one member selected from the group consisting of lithium carbonate ($Li_2CO_3$), lithium hydroxide (LiOH), lithium phosphate ($Li_3PO_4$), lithium hydrogen phosphate ($Li_2HPO_4$) and lithium dihydrogen phosphate ($LiH_2PO_4$), whereby $Li_nFe_2(PO_4)_3$ (0<n≦3) particles are likely to be obtained. Further, lithium nitrate ($LiNO_3$), lithium chloride (LiCl), lithium sulfate ($Li_2SO_4$), an organic salt such as lithium oxalate (($COOLi)_2$) or lithium acetate ($CH_3COOLi$) may be used. Such compounds may be hydrates containing hydration water.

As the Fe source, it is preferred to use at least one member selected from the group consisting of ferrous oxide (FeO), ferrosoferric oxide ($Fe_3O_4$), ferric oxide ($Fe_2O_3$), ferric oxyhydroxide (FeO(OH)), metal iron (Fe), ferric phosphate ($FePO_4$), ferrous phosphate ($Fe_3(PO_4)_2$) and ferric pyrophosphate ($Fe_4(P_2O_7)_3$), whereby $Li_nFe_2(PO_4)_3$ (0<n≦3) particles are likely to be obtained. Among them, $Fe_3O_4$ (ferrosoferic oxide/magnetite) or $Fe_2O_3$ (ferric oxide/hematite) is more preferred, and $Fe_2O_3$ is particularly preferred, since it is available at a low cost and easily handled. Further, iron nitrate ($Fe(NO_3)_2$, $Fe(NO_3)_3$), iron chloride ($FeCl_2$, $FeCl_3$), iron sulfate ($FeSO_4$, $Fe_2(SO_4)_3$), an organic salt such as iron oxalate ($Fe(COO)_2$), iron acetate ($Fe(CH_3COO)_2$) or iron citrate ($FeC_6H_5O_7$) may also be used. Such compounds may be hydrates containing hydration water.

As the P source, it is preferred to use at least one member selected from the group consisting of phosphorus pentoxide ($P_2O_5$), phosphoric acid ($H_3PO_4$), ammonium phosphate (($NH_4)_3PO_4$), ammonium phosphate, dibasic (($NH_4)_2HPO_4$), ammonium phosphate, monobasic ($NH_4H_2PO_4$), ferric phosphate ($FePO_4$), ferrous phosphate ($Fe_3(PO_4)_2$) and ferric pyrophosphate ($Fe_4(P_2O_7)_3$), whereby $Li_nFe_2(PO_4)_3$ ($0<n\leq 3$) particles are likely to be obtained. Such compounds may be hydrates containing hydration water.

A preferred combination of the Li source, the Fe source and the P source in the present invention is a combination of lithium carbonate ($Li_2CO_3$) and/or lithium hydrogen carbonate ($LiHCO_3$) as the Li source in view of availability and handlability, ferric oxide ($Fe_2O_3$) and/or ferrosoferric oxide ($Fe_3O_4$) as the Fe source in view of availability and handlability and ammonium phosphate, monobasic ($NH_4H_2PO_4$) and/or ammonium phosphate, dibasic (($NH_4)_2HPO_4$) as the P source in view of availability. More preferred is a combination of lithium carbonate ($LI_2CO_3$) as the Li source, ferric oxide ($Fe_2O_3$) as the Fe source and ammonium phosphate, monobasic ($NH_4H_2PO_4$) as the P source in view of low cost.

The purity of each element is not particularly limited within a range not to decrease the properties, however, the purity excluding water of hydration is preferably at least 99%, more preferably at least 99.9%. The grain size of each material is also not particularly limited so long as a uniform melt is obtained by melting. The respective materials are preferably melted after mixed dryly or wetly by means of a mixing/pulverizing means such as a ball mill or a planetary mill. The particle size of each material is not particularly limited so long as the mixing state, an operation of putting the materials in a melting container, and melting properties are not impaired.

Melting of the material mixture is carried out preferably in the air, under oxidizing conditions where the oxygen partial pressure is adjusted ($0.21<$ oxygen partial pressure $\leq 1.0$) or under oxidizing conditions where the oxygen flow rate is controlled. A crucible to be used for melting is preferably made of alumina, platinum or a platinum alloy containing rhodium, but a crucible made of a refractory may also be used. Further, in order to prevent volatilization and evaporation, melting is carried out preferably in a crucible with a rid.

Melting is carried out preferably by using a resistance heating furnace, a high frequency induction furnace or a plasma-arc furnace. The resistance heating furnace is preferably an electric furnace provided with a heating element made of a metal such as a nichrome alloy, made of silicon carbide or made of molybdenum silicide. The high frequency induction furnace is one provided with an induction coil and capable of controlling the output. The plasma-arc furnace is one employing carbon or the like as an electrode, and utilizing the plasma-arc generated by the electrode. Further, the melting may be carried out by infrared heating or by direct heating by laser:

The material mixture may be melted in a powder state, or it may be formed and then melted. In the case of using a plasma-arc furnace, it is possible to form the mixture, melt the formed mixture as it is and then cool the melt. The melting of the material mixture is carried out preferably at Ia temperature of at least 800° C., more preferably from 1,000 to 1,300° C. The obtained glass melt may be stirred to increase uniformity.

[Cooling Step]

The cooling step is a step of rapidly cooling the melt obtained in the melting step to the vicinity of room temperature to obtain a solidified product. The solidified product is preferably amorphous. Further, it may contain a small amount of crystallized products. The small amount of the crystallized products function as crystal nuclei of crystals to be finally obtained in the heating step as a post-step, whereby crystallization will easily be controlled. The rate of cooing the melt is preferably at least 100° C./sec, more preferably from $1\times 10^4$ to $1\times 10^{8 o}$ C./sec. The atmosphere is not necessarily be particularly controlled, and this step may be carried out in the air or may be carried out under oxidizing conditions. In order to accelerate the cooling, compressed air or a gas rich in oxygen may be sprayed to a cooling portion.

In the cooling step, preferably employed is a method of dropping the melt between twin rolls rotating at a high speed to obtain a solidified product in the flake form, or a method of continuously winding the solidified product in the fiber form (long fiber) from the melt with use of a drum rotating at a high speed. The twin rollers and the drum are preferably those made of metal or ceramics. In addition, a solidified product in the fiber form (short fiber) may be obtained by use of a spinner having pores in a side wall and rotating at a high speed. By using one of these apparatus, the melt is effectively cooled to obtain a solidified product having a uniform chemical composition with a high purity.

In a case where the solidified product is of the flake form, the melt is preferably cooled so that an average thickness of the flakes is at most 200 μm, more preferably at most 100 μm. In a case where the solidified product is of the fiber form, the melt is preferably cooled so that an average diameter of the fibers is at most 50 μm, more preferably at most 30 μm. By adjusting the average thickness or the average diameter to at most the above upper limit, a crystallization efficiency in the subsequent pulverizing step and heating step can be increased. Here, the average thickness in the case of the flake form can be measured with a vernier caliper or a micrometer. The average diameter in the case of the fiber form can be measured by the above method or by observation with a microscope.

[Pulverizing Step]

The pulverizing step is a step of pulverizing the solidified product obtained in the cooling step into a desired particle shape to obtain a pulverized product, and in such a pulverizing step, the particle size and its distribution are controlled within preferred ranges.

By pulverizing the solidified product before crystallization obtained in the cooling step into a desired particle shape, the uniformity of the composition of the respective particles can be increased. Further, since it is unnecessary to consider the influence of the internal stress caused at the time of pulverizing as mentioned hereinafter, the uniformity of the particle size can be increased and in addition, by heating such particles (pulverized product) being excellent in the uniformity of the composition and the particle size, crystallinity of the respective particles can be improved.

Here, if the solidified product is heated without being pulverized and then pulverized to produce lithium iron phosphate particles, the crystallinity of the particles is likely to be decreased and in addition, there is a possibility that the primary particles are pulverized (destroyed), which may cause an internal stress in the particles, whereby the function of the lithium iron phosphate particles is remarkably decreased. The mechanism how the internal stress is caused by such an operation is not clearly understood, and it is estimated that if the solidified product without being pulverized is subjected to heat treatment in a state where there is a dispersion of the size, the energy applied to the solidified product by heating will not uniformly be diffused through the solidified product. Further, it is considered that if the solidified product is pulverized after heating, an energy to an extent not to lead to destruction may be accumulated as the stress in the interior of the pulverized product.

Accordingly, in the production process of the present invention, the solidified product obtained in the cooling step is pulverized so as to achieve aimed particle size and distribution, and then the heating step for crystallization is carried out. In the $Li_nFe_2(PO_4)_3$ ($0<n\leqq3$) particles obtained in the heating step after pulverizing, as described hereinafter, the most of the internal stress caused in the pulverizing step is considered to disappear by heat applied at the time of crystallization, and accordingly the function which the $Li_nFe_2(PO_4)$ ($0<n\leqq3$) particles originally have can be obtained with high reproducibility, and it is possible to maintain the function.

Here, as one method to evaluate the internal stress of a powder, lattice distortion determined from an X-ray diffraction pattern in accordance with the formula X may be mentioned.

$$\beta \cos \theta = \lambda/D + 2\eta \sin \theta \quad \text{Formula X}$$

wherein $\beta$ is a diffraction line width (rad), $\theta$ is a diffraction angel) (°), $\lambda$ is a wavelength (nm) of an X-ray, D is a crystallite size (nm) and $\eta$ is a lattice distortion. By plotting $\sin \theta$ relative to $\beta \cos \theta$, $\eta$ is obtained from the slope of the straight line. However, since $\eta$ is a relative value, a value of $\eta$ of an object smaller than that of a comparison (control) substance means a smaller internal stress. Accordingly, it is considered that when this value of $\eta$ is relatively smaller, the internal stress is smaller, and particularly excellent cell performance such as cycle properties can be obtained.

The pulverizing step is carried out preferably dryly by means of a ball mill, a jet mill or a planetary mill. Further, in a case where the solidified product is soluble in a solvent to be used to an extent not to bring about adverse effect in the crystallizing step, the solidified product may be pulverized wetly by using pure water or an organic solvent. The particle size after pulverizing is not particularly limited and is properly set depending on the purpose of use, and in a case where the solidified product is in the flake form, the particle size after pulverizing is preferably from 10 nm to 10 μm by the median diameter based on volume, and it is more preferably from 10 nm to 5 μm, whereby the discharge properties of the lithium iron phosphate particles to be obtained by subsequent heating will be increased. In a case where the solidified product is in the fiber form, it is preferably pulverized so that the length will be from 10 nm to 5 μm.

Further, it is also possible to mix the solidified product with at least one member selected from organic compounds and carbon powders, followed by pulverizing. Organic compounds and carbon powders can make an electrically conductive material be uniformly and firmly bonded to the surface of the lithium iron phosphate particles. Accordingly, they can increase the electrical conductivity and reliability of a cathode material for a secondary cell comprising the lithium iron phosphate particles. That is, a cathode material for a secondary cell being excellent in the properties including the electrical conductivity and reliability can be obtained with good reproducibility. Therefore, a cathode material for a secondary cell which can improve the capacity of e.g. a lithium ion secondary cell and in addition, which can maintain the properties and reliability over a long period of time, can be provided.

The organic compound is preferably at least one member selected from saccharides, amino acids, peptides, aldehydes and ketones, and saccharides, amino acids and peptides are particularly preferred. The saccharides may, for example, be monosaccharides such as glucose, fructose and galactose, oligosaccharides such as sucrose, maltose, cellobiose and trehalose, polysaccharides such as invert sugar, dextrin, amylose, amylopectin and cellulose, and analogous materials thereof such as ascorbic acid. Monosaccharides and some of oligosaccharides having strong reducing power are preferred.

The amino acids may, for example, be an amino acid such as alanine or glycine. The peptides may be low molecular peptides having a molecular weight of at most 1,000. Further, organic compounds having a reducing functional group such as an aldehyde group or a ketone group may be mentioned. As the organic compounds, especially suitably is glucose, sucrose, glucose-fructose invert sugar, caramel, starch, pregelatinized starch or carboxymethyl cellulose.

As the carbon powders, it is preferred to use e.g. carbon black, graphite or acetylene black. By adding a carbon powder in the pulverizing step, it is not necessary to separately provide a step of mixing a carbon powder after the lithium iron phosphate particles are formed after the heating step. Further, by adding a carbon powder together with an organic compound in the pulverizing step, the distribution of the carbon powder in the lithium iron phosphate particles will be uniform, and the contact area with the organic compound or its thermally decomposed product (carbide) will be large, whereby the binding power of the carbon powder to the lithium iron phosphate particles can be increased.

[Heating Step]

The heating step is a step of heating the pulverized product obtained by preliminarily pulverizing the solidified product obtained in the cooling step to a desired particle shape, to obtain a precipitate (crystallized product) containing crystals of $Li_nFe_2(PO_4)_3$ ($0<n\leqq3$).

The heating step has an effect of relaxing or removing the stress of the pulverized product and the formed crystallized product. It is considered that the stress accumulated by pulverizing of the solidified product is relaxed or removed by uniformly dispersing an energy by heating for crystallization to the pulverized product. By the heating step after the pulverizing step, not only the stress in the pulverized product but also the stress in the formed crystallized product can be relaxed or removed.

The heating temperature is from 350 to 800° C. When the heating temperature is at least 350° C., crystals are likely to be precipitated. When the heating temperature is at most 800° C., the pulverized product (solidified product) will not be melted. The heating temperature is more preferably from 400 to 650° C., whereby particles having proper particle size and particle size distribution are likely to be obtained.

In the heating step, the temperature may be maintained at a certain temperature, or the temperature may be set in stages. Within from 350 to 800° C., the higher the heating temperature, the larger the particle size of precipitated crystals tends to be, and accordingly, the heating temperature may be set depending on the desired particle size.

The heating time is preferably from 2 to 32 hours, in view of formation of the crystal nuclei and particle growth. The longer the heating time, the larger the particle size of precipitated crystals tends to be, and accordingly the crystallization time may be set depending on the desired particle size.

The heating step is carried out in the air or under oxidizing conditions with an oxygen partial pressure of higher than 0.21 and at most 1.0. The oxidizing conditions employed here are oxidizing conditions from conditions containing oxygen exceeding the oxygen partial pressure in the air (the gas components other than oxygen are nitrogen, argon, etc., for example) to pure oxygen conditions. The same applies to a case where oxidizing conditions are employed in another step. By carrying out the heating step in such an atmosphere, the $Li_nFe_2(PO_4)_3$ ($0<n\leq3$) particles can be obtained with good reproducibility. Further, compressed air or a gas rich in oxygen may be made to flow in the heating space so as to accelerate oxidation of the particles and to reduce or eliminate $Fe^{2+}$ in the crystals.

Further, heating may be carried out after mixing at least one member selected from organic compounds and carbon powders. Organic compounds and carbon powders can make an electrically conductive material be uniformly and firmly bonded to the surface of the lithium iron phosphate particles. Accordingly, they can increase the electrical conductivity and reliability of a cathode material for a secondary cell comprising the lithium iron phosphate particles. That is, a cathode material for a secondary cell being excellent in the properties including the electrical conductivity and reliability can be obtained with good reproducibility. Therefore, a cathode material for a secondary cell which can improve the capacity of e.g. a lithium ion secondary cell and in addition, which can maintain the properties and reliability over a long period of time, can be provided.

With respect to the particle size of the lithium iron phosphate particles to be obtained, in order to increase the discharge properties, the average particle size is preferably from 10 nm to 5 μm, more preferably from 10 nm to 3 μm by the median diameter based on volume. Further, the specific surface area determined by a nitrogen adsorption method is preferably from 0.5 m²/g to 200 m²/g. The crystallite size is a value determined from the broadening of the half value width of the X-ray diffraction peak, and is preferably from 5 nm to 200 nm, more preferably from 10 nm to 50 nm, with a view to obtaining good discharge properties.

By means of the above-described respective steps of melting, cooling, pulverizing and heating (crystallization), $Li_nFe_2(PO_4)_3$ ($0<n\leq3$) particles (particles containing $Li_nFe_2(PO_4)_3$ crystals), i.e. NASICON type lithium iron phosphate particles can be obtained. In a case where a substance other than the aimed lithium iron phosphate particles exist, it may be removed by washing with water when it is water-soluble. Further, it may be removed by a dilute acid or dilute alkali solution. Further, in a case where secondary particles exist, they may be ground and pulverized to such an extent that the primary particles are not destroyed.

According to the production process of the present invention, $Li_nFe_2(PO_4)_3$ ($0<n\leq3$) particles (particles containing $Li_nFe_2(PO_4)_3$ crystals) being excellent in the uniformity of the particle size and the chemical composition and having high crystallinity, i.e. NASICON type lithium iron phosphate particles can be obtained. Further, since the obtained particles have high crystallinity, a decrease in the function in repeated use can be suppressed. Accordingly, lithium iron phosphate particles capable of maintaining the properties and reliability over a long period of time, as a material for a solid electrolyte to be used for e.g. a cell, a gas sensor or a double layer capacitor, or a cathode material for a secondary cell, can be provided.

The lithium iron phosphate particles produced by the production process of the present invention are preferably such that the valency of Fe in the $Li_nFe_2(PO_4)_3$ ($0<n\leq3$) crystals is +3-valent, whereby the uniformity of the chemical composition of the lithium iron phosphate particles and the reliability can be improved. Such $Li_nFe_2(PO_4)_3$ ($0<n\leq3$) particles can be obtained only by controlling the atmosphere in the heating step, but they can easily be obtained by controlling the atmosphere in the melting step, further by carrying out all the steps in the air or under oxidizing conditions (0.21<oxygen partial pressure$\leq$1.0).

Further, the lithium iron phosphate particles produced by the production process of the present invention preferably have $Li_3Fe_2(PO_4)_3$ crystals. By having the $Li_3Fe_2(PO_4)_3$ crystals, the properties of the lithium iron phosphate particles as a solid electrolyte material or a cathode material for a secondary cell can be improved. The lithium iron phosphate particles having $Li_3Fe_2(PO_4)_3$ crystals can be obtained e.g. by controlling the composition of the melt.

Further, the lithium iron phosphate particles may be particles wherein Fe is replaced with M (wherein M is at least one member selected from Mn, Co and Ni) in order to improve the cell performance, and the composition is preferably $Li_3Fe_{2-x}M_x(PO_4)_3$ ($0.01\leq x\leq 1.0$).

EXAMPLES

Now, the present invention will be described in further detail with reference to Examples. However, it should be understood that the present invention is by no means restricted thereto.

Examples 1 to 6

Lithium carbonate ($Li_2CO_3$), ferric oxide ($Fe_2O_3$) and ammonium phosphate, monobasic ($NH_4H_2PO_4$) were respectively weighed so that a melt had a composition shown in Table 1 as represented by mol % based on $Li_2O$, $Fe_2O_3$ and $P_2O_5$, and they were dryly mixed and pulverized to prepare a material mixture. This material mixture was put in a crucible with a nozzle, made of a platinum alloy containing 20 mass % of rhodium, and heated in an electric furnace with a heating element made of molybdenum silicide at 1,300° C. for 0.5 hour to be melted. The melting was carried out in the air.

Then, the glass melt was dropped while heating the bottom end of the nozzle provided in the crucible by the electric furnace, and droplets were made to pass between twin rolls with a diameter of about 15 cm rotating at 300 rpm so that the droplets were cooled at a cooling rate of about $1\times10^{5}$° C./sec to obtain a solidified product in the flake form. The thickness of the flakes thus obtained was measured by a micrometer, whereupon it was from 50 to 80 μm. The solidified product in the flake form was dryly pulverized in the air for 8 hours by using zirconia balls. The pulverized product was subjected to a sieving with an opening of 106 μm. The particle size of the pulverized product of the solidified product in the flake form obtained in Example 4 was measured by a laser diffraction/scattering type particle size distribution meter, whereupon it was 3.7 μm by the median diameter based on volume.

Using part of the above-described pulverized product, the crystallization temperature was preliminarily obtained by differential scanning calorimetry (DSC), and the pulverized product was heated in the air for 8 hours at a temperature in the vicinity of each crystallization temperature to precipitate $Li_nFe_2(PO_4)_3$ ($0<n\leq3$) crystals, thereby to produce lithium iron phosphate particles. The heating temperature for crystallization in each of Examples 1 to 6 is shown in Table 1.

The mineral phase of the obtained lithium iron phosphate particles was identified by an X-ray diffraction apparatus. As a result, in all of Examples 1 to 6, a diffraction pattern analogous to a diffraction peak of existing $Li_3Fe_2(PO_4)_3$ (PDF No. 01-078-1106) was obtained. The X-ray diffraction pattern of particles obtained in Example 4 is shown in FIG. 1. Further, the particle size of particles obtained in Example 4 was measured by a laser diffraction/scattering type particle size distribution meter, whereupon the median diameter based on volume was 2.4 μm. Further, dry pulverizing was carried out by a planetary mill using zirconia balls as a medium. The median diameter based on volume of the pulverized product was 1.8 μm. Further, the specific surface area was measured by a nitrogen adsorption method, whereupon it was 1.1 $m^2/g$.

TABLE 1

| | Chemical composition of melt (mol %) | | | Heating temperature |
|---|---|---|---|---|
| | $Li_2O$ | $Fe_2O_3$ | $P_2O_5$ | (° C.) |
| Example 1 | 16.7 | 33.3 | 50.0 | 550 |
| Example 2 | 23.1 | 30.8 | 46.1 | 550 |
| Example 3 | 28.6 | 28.6 | 42.8 | 540 |
| Example 4 | 37.5 | 25.0 | 37.5 | 480 |
| Example 5 | 44.5 | 22.2 | 33.3 | 420 |
| Example 6 | 47.3 | 21.1 | 31.6 | 410 |

Example 7

Using a material mixture obtained by mixing and pulverizing lithium carbonate ($Li_2CO_3$), ferrosoferric oxide ($Fe_3O_4$) and ammonium phosphate, monobasic ($NH_4H_2PO_4$) so that a melt had the same composition as in Example 4 as represented by mol % based on $Li_2O$, $Fe_2O_3$ and $P_2O_5$, the respective steps of melting, cooling and pulverizing were carried out in the same manner as in Example 1. Further, a heating step was carried out in the same manner as in Example 1 except that the heating temperature was changed to 460° C. The X-ray diffraction of the obtained particles was carried out, whereupon the X-ray diffraction pattern was confirmed to be analogous to a diffraction peak of existing $Li_3Fe_2(PO_4)_3$ (PDF No. 01-078-1106).

Examples 8 and 9

Particles were produced in the same manner as in Example 7 except that as the starting materials, lithium phosphate ($Li_3PO_4$) and ferric phosphate ($FePO_4$) were used in Example 8 or lithium carbonate ($Li_2CO_3$), ferric phosphate ($FePO_4$) and ammonium phosphate, monobasic ($NH_4H_2PO_4$) were used in Example 9. X-ray diffraction of the obtained particles was carried out, whereupon each of the X-ray diffraction patterns was confirmed to be analogous to a diffraction peak of existing $Li_3Fe_2(PO_4)_3$ (PDF No. 01-078-1106).

Example 10

Lithium carbonate ($Li_2CO_3$), ferric oxide ($Fe_2O_3$), manganese oxide ($MnO_2$) and ammonium phosphate, monobasic ($NH_4H_2PO_4$) were respectively weighed so that a melt had a composition comprising, as represented by mol %, 36.6% of $Li_2O$, 22.0% of $Fe_2O_3$, 4.8% of $MnO_2$ and 36.6% of $P_2O_5$, and in the same manner as in Example 4, a material mixture was prepared, melted, quenched and heated to obtain manganese-containing lithium iron phosphate particles. In this blending, the Mn/(Fe+Mn) atomic ratio was 0.1. The X-ray diffraction analysis of the obtained particles was carried out, whereupon the X-ray diffraction pattern was analogous to a diffraction peak of existing $Li_3Fe_2(PO_4)_3$ (PDF No. 01-078-1106), and it was confirmed that Mn was solid-solved.

Example 11

The cathode material particles obtained by pulverizing in Example 4 were used as an active material, and the particles, a polyvinylidene fluoride resin as a binder and acetylene black as an electrically conductive material were weighed in a mass ratio of 85:5:10, and they were well mixed with N-methylpyrrolidone as a solvent to obtain a slurry. This slurry was applied on an aluminum foil having a thickness of 30 μm by a bar coater and dried in the air at 120° C. to remove the solvent, and then the coating layer was densified by roll pressing and cut into a strip having a width of 10 mm and a length of 40 mm.

The coating layer was removed except for a portion of 10×10 mm at the tip of the aluminum foil in the strip form, to obtain an electrode. The coating layer thickness of the obtained electrode after roll pressing was 20 μm. The obtained electrode was vacuum dried at 150° C. and put in a globe box filled with a purified argon gas, and was disposed to face a counter electrode having a lithium foil contact-bonded to a nickel mesh by means of a separator made of a porous polyethylene film, and further, the both sides were sandwiched between polyethylene plates and fixed.

The opposing electrodes were put in a polyethylene beaker, and a non-aqueous electrolytic solution having lithium hexafluorophosphate dissolved in a mixed solvent of ethylene carbonate with ethyl methyl carbonate (1:1 volume ratio) at a concentration of 1 mol/L was injected so that the electrodes were sufficiently impregnated therewith. The electrodes after impregnation with the electrolytic solution were taken out from the beaker and put in an aluminum laminate film bag, and the lead wire portion was taken out and sealed to constitute a half cell. The properties of the half cell were measured as follows.

The obtained half cell was put in a constant temperature oven at 25° C. and connected with a constant current charge and discharge tester (manufactured by HOKUTO DENKO CORPORATION, apparatus name: HJ201B) to carry out charge and discharge test. Charge and discharge were carried out with a current density of a current value of 65 mA/g per mass of the electrode active material (mass excluding the electrically conductive material and the binder). The discharge termination voltage was 2.0 V based on Li counter electrode. The discharge termination potential was 4.2 V based on Li counter electrode. This charge and discharge cycle was repeated 5 times. The discharge capacity after the fifth cycle was 59 mAh/g.

Comparative Example 1

Lithium carbonate ($Li_2CO_3$), ferrosoferric oxide ($Fe_3O_4$) and ammonium phosphate, monobasic ($NH_4H_2PO_4$) were respectively weighed so that a melt had a composition comprising, as represented by mol %, 30.0% of $Li_2O$, 5.0% of $Fe_2O_3$ and 65.0% of $P_2O_5$, and they were dryly mixed and pulverized to prepare a material mixture. The respective steps of melting, cooling, pulverizing and heating were carried out in the same manner as in Example 1 except that melting of the material mixture was carried out at 1,000° C. X-ray diffraction of the obtained particles was carried out, whereupon no distinct peak was detected.

Comparative Example 2

Lithium carbonate ($Li_2CO_3$), ferrosoferric oxide ($Fe_3O_4$) and ammonium phosphate, monobasic ($NH_4H_2PO_4$) were respectively weighed so that a melt had the same composition as in Example 4 as represented by mol % based on $Li_2O$, $Fe_2O_3$ and $P_2O_5$, and they were mixed. This resulting mixture was pulverized by using acetone to as a solvent and further dried under reduced pressure. This dried powder was heated in the air at 850° C. for 8 hours for reaction. Then, the reacted powder was pulverized in the air for 8 hours by using zirconia balls to produce lithium iron phosphate particles.

X-ray diffraction of the obtained particles was carried out, whereupon the X-ray diffraction pattern was confirmed to be analogous to a diffraction peak of existing $Li_3Fe_2(PO_4)_3$ (PDF No. 01-078-1106). However, the crystallite size and the lattice distortion as observed from the broadening of the X-ray diffraction peak were 80 nm and 0.51%, respectively. Whereas, the crystallite size and the lattice distortion of the particles in Example 4 were 36 nm and 0.11%, respectively. Accordingly, the lattice distortion i.e. the internal stress in Comparative Example 2 is considered to be about 5 times.

Industrial Applicability

The present invention is applicable to production of NASICON type lithium iron phosphate particles for a secondary cell.

This application is a continuation of PCT Application No. PCT/JP2010/056032, filed Apr. 1, 2010, which is based upon and claims the benefit of priority from Japanese Patent Application No. 2009-091581 filed on Apr. 3, 2009. The contents of those applications are incorporated herein by reference in its entirety.

What is claimed is:

1. A process for producing lithium iron phosphate particles, which comprises:
    obtaining a melt containing, as represented by mol % based on oxides, from 1 to 50% of $Li_2O$, from 20 to 50% of $Fe_2O_3$ and from 30 to 60% of $P_2O_5$;
    cooling and solidifying the melt to obtain a solidified product;
    pulverizing the solidified product to obtain a pulverized product; and
    heating the pulverized product in the air or under oxidizing conditions with an oxygen partial pressure of higher than 0.21 and at most 1.0 atmosphere from 350 to 800° C. to precipitate crystals of $Li_nFe_2(PO_4)_3$ ($0<n\leq3$).

2. The process for producing lithium iron phosphate particles according to claim 1, wherein each of the obtaining, the cooling, the pulverizing and the heating are carried out in the air or under oxidizing conditions with an oxygen partial pressure of higher than 0.21 and at most 1.0 atmosphere from 350 to 800° C.

3. The process for producing lithium iron phosphate particles according to claim 1, wherein the valency of Fe in the crystals is +3-valent.

4. The process for producing lithium iron phosphate particles according to claim 1, wherein the $Li_nFe_2(PO_4)_3$ is $Li_3Fe_2(PO_4)_3$.

5. The process for producing lithium iron phosphate particles according to claim 1, wherein the rate of cooling the melt is at least 100° C./sec.

6. The process according to claim 1, wherein the obtaining of the melt comprises:
    mixing a $Li_2O$ source, a $Fe_2O_3$ source and a $P_2O_5$ source to obtain a material mixture; and
    heating the material mixture to obtain the melt.

7. The process for producing lithium iron phosphate particles according to claim 6, wherein the $Li_2O$ source is at least one member selected from the group consisting of lithium carbonate ($Li_2CO_3$), lithium hydroxide (LiOH), lithium phosphate ($Li_3PO_4$), lithium hydrogen phosphate ($Li_2HPO_4$), lithium dihydrogen phosphate ($LiH_2PO_4$), a hydrate of lithium carbonate ($Li_2CO_3$), a hydrate of lithium hydroxide (LiOH), a hydrate of lithium phosphate ($Li_3PO_4$), a hydrate of lithium hydrogen phosphate ($Li_2HPO_4$), and a hydrate of lithium dihydrogen phosphate ($LiH_2PO_4$).

8. The process for producing lithium iron phosphate particles according to claim 6, wherein the $Fe_2O_3$ source is at least one member selected from the group consisting of ferrous oxide (FeO), ferrosoferric oxide ($Fe_3O_4$), ferric oxide ($Fe_2O_3$), ferric oxyhydroxide (FeO(OH)), metal iron (Fe), ferric phosphate ($FePO_4$), ferrous phosphate ($Fe_3(PO_4)_2$), ferric pyrophosphate ($Fe_4(P_2O_7)_3$), a hydrate of ferrous oxide (FeO), a hydrate of ferrosoferric oxide ($Fe_3O_4$), a hydrate of ferric oxide ($Fe_2O_3$), a hydrate of ferric oxyhydroxide (FeO(OH)), a hydrate of metal iron (Fe), a hydrate of ferric phosphate ($FePO_4$), a hydrate of ferrous phosphate ($Fe_3(PO_4)_2$), and a hydrate of ferric pyrophosphate ($Fe_4P_2O_7)_3$).

9. The process for producing lithium iron phosphate particles according to claim 6, wherein the $P_2O_5$ source is at least one member selected from the group consisting of phosphorus pentoxide ($P_2O_5$), phosphoric acid ($H_3PO_4$), ammonium phosphate (($NH_4)_3PO_4$), ammonium phosphate, dibasic (($NH_4)_2HPO_4$), ammonium phosphate, monobasic ($NH_4H_2PO_4$), ferric phosphate ($FePO_4$), ferrous phosphate ($Fe_3(PO_4)_2$), ferric pyrophosphate ($Fe_4(P_2O_7)_3$), a hydrate of phosphorus pentoxide ($P_2O_5$), a hydrate of phosphoric acid ($H_3PO_4$), a hydrate of ammonium phosphate (($NH_4)_3PO_4$), a hydrate of ammonium phosphate, dibasic (($NH_4)_2HPO_4$), a hydrate of ammonium phosphate, monobasic ($NH_4H_2PO_4$), a hydrate of ferric phosphate ($FePO_4$), a hydrate of ferrous phosphate ($Fe_3(PO_4)_2$), and a hydrate of ferric pyrophosphate ($Fe_4(P_2O_7)_3$).

10. The process for producing lithium iron phosphate particles according to claim 6, wherein the $Fe_2O_3$ source is ferric oxide ($Fe_2O_3$).

11. The process according to claim 1, wherein the lithium iron phosphate particles have an average particle size of 10 nm to 5 μm.

12. The process according to claim 1, wherein the lithium iron phosphate particles have a specific surface area of 0.5 to 200 $m^2/g$.

13. A method for producing a secondary cell, said method comprising:
    obtaining a melt containing, as represented by mol % based on oxides, from 1 to 50% of $Li_2O$, from 20 to 50% of $Fe_2O_3$ and from 30 to 60% of $P_2O_5$;
    cooling and solidifying the melt to obtain a solidified product;
    pulverizing the solidified product to obtain a pulverized product;
    heating the pulverized product in the air or under oxidizing conditions with an oxygen partial pressure of higher than 0.21 and at most 1.0 atmosphere from 350 to 800° C. to precipitate crystals of $Li_nFe_2(PO_4)_3$ ($0<n\leq3$); and
    forming a secondary cell from a cathode material comprising the crystals.

14. The process according to claim 13, wherein the obtaining of the melt comprises:
    mixing a $Li_2O$ source, a $Fe_2O_3$ source and a $P_2O_5$ source to obtain a material mixture; and
    heating the material mixture to obtain the melt.

* * * * *